United States Patent [19]

Fujisaki

[11] Patent Number: 5,029,223
[45] Date of Patent: Jul. 2, 1991

[54] CONSTRAINT DRIVEN-ON LINE RECOGNITION OF HANDWRITTEN CHARACTERS AND SYMBOLS

[75] Inventor: Tetsunosuke Fujisaki, Armonk, N.Y.

[73] Assignee: International Business Machines Corporation, Armonk, N.Y.

[21] Appl. No.: 474,271

[22] Filed: Feb. 2, 1990

[51] Int. Cl.$^5$ .............................................. G06K 9/00
[52] U.S. Cl. ...................................... 382/13; 382/24; 382/37
[58] Field of Search ............................ 382/13, 24, 37

[56] References Cited

U.S. PATENT DOCUMENTS

| | | | |
|---|---|---|---|
| 4,024,500 | 5/1977 | Herbst et al. | 340/146.3 SG |
| 4,284,975 | 8/1981 | Odaka | 340/146.3 J |
| 4,317,109 | 2/1982 | Odaka et al. | 340/146.3 J |
| 4,653,107 | 3/1987 | Shojima et al. | 382/13 |
| 4,654,873 | 3/1987 | Fujisawa et al. | 382/9 |
| 4,680,804 | 7/1987 | Kuzunuki et al. | 382/13 |
| 4,718,103 | 1/1988 | Shojima et al. | 382/13 |
| 4,727,588 | 2/1988 | Fox et al. | 382/13 |
| 4,731,857 | 3/1988 | Tappert | 382/9 |
| 4,764,972 | 8/1988 | Yoshida et al. | 382/13 |
| 4,805,225 | 2/1989 | Clark | 382/15 |
| 4,860,372 | 8/1989 | Kuzunuki et al. | 382/13 |
| 4,878,249 | 10/1989 | Mifune et al. | 382/13 |

OTHER PUBLICATIONS

"Handwriting Recognition by Substroke Segmentation and Composition" by J. M. Kurtzberg and C. C. Tappert, IBM Tech. Disc. Bulletin, vol. 27, No. 9, 2/85.
"Segmentation Procedure for Handwritten Symbols and Words", J. M. Kurtzberg et al., IBM Technical Disclosure Bulletin, vol. 25, No. 7B, Dec. 1982.
"Flexible, Space-Time Segmenter for Handwritten Words" A. Fox et al.
IBM Technical Disclosure Bulletin, vol. 29, No. 11, Apr. 1987, "Problem Solving Methods in Artificial Intelligence", pp. 54–59, McGraw Hill, 1971.

Primary Examiner—David K. Moore
Assistant Examiner—Dan Santos
Attorney, Agent, or Firm—Perman & Green

[57] ABSTRACT

Method and apparatus for identifying a valid symbol or a string of valid symbols from a sequence of handwritten strokes. A method includes the steps of (a) generating in response to one or more handritten strokes a plurality of stroke labels each having an associated score; (b) processing the plurality of stroke labels in accordance with a beam search-like technique to identify those stroke labels indicative of a valid symbol or portion of a valid symbol; and (c) associating together identified stroke labels to determine an identity of a valid symbol or a string of valid symbols therefrom. An aspect of the invention is that each of the constraint validation filters is switchably coupled into a serial filter chain. The switches function to either couple a filter input to a stroke label or decouple the input and provide a path around the filter block. An application writer has available a plurality of constraint filters. The application writer specifies which one or ones of the constraint filters are to be applied for a specific sequence of strokes.

32 Claims, 6 Drawing Sheets

| OPEN/CLOSE | STACK LABEL | SCORE | BACK CHAIN |
|---|---|---|---|
| C | 1/1 c | -45 | |
| O | 1/1 C | -40 | |
| C | 2/2 B | -40 | |
| O | 1/2 G | -30 | |
| C | 1/4 E | -30 | |
| C | 1/2 B | -30 | |
| O | 1/2 D | -30 | |
| O | 1/3 F | -30 | |
| O | 1/1 1 | -30 | |
| O | 1/3 H | -30 | |
| O | 1/1 ( | -20 | |
| C | 2/2 A | -20 | |
| C | 1/2 A | -10 | |
| C | START | 0 | |

ABc

| OPEN/CLOSE | STACK LABEL | SCORE | BACK CHAIN |
|---|---|---|---|
| O | EOW | -60 | |
| C | 1/1 c | -45 | |
| C | 1/1 C | -40 | |
| C | 2/2 B | -40 | |
| O | 1/2 G | -30 | |
| C | 1/4 E | -30 | |
| C | 1/2 B | -30 | |
| O | 1/2 D | -30 | |
| C | 2/2 A | -20 | |
| C | 1/2 A | -10 | |
| C | START | 0 | |

ABC

CONSTRAINT DRIVEN-ON LINE RECOGNITION OF HANDWRITTEN CHARACTERS AND SYMBOLS

FIELD OF THE INVENTION

This invention relates generally to methods and apparatus for accomplishing recognition of handwritten symbols and, in particular, relates to methods and apparatus that accomplishes constraint-driven recognition of on-line handwritten characters and symbols.

BACKGROUND OF THE INVENTION

Symbols such as handwriting, when traced on electronic tablets, are typically represented by sequences of x-y coordinate pairs. A fundamental unit of handwriting is the stroke wherein a stroke can be considered as a sequence of points, represented by their respective x-y coordinates, which are generated between a tablet pen-down and pen-up motion of the writer. Characters and symbols are collections or sets of such strokes.

In a character identification system a first processing step is known as segmentation. Segmentation involves pre-processing, prior to processing by the character recognizer, the stroke input data to partition the strokes of a character, a symbol or possibly a word.

Various prior art handwritten segmentation method and apparatus are described in the following documents. In Herbst U.S. Pat. No. 4,024,500, May 17, 1977, disclose a segmentation method and apparatus which utilizes a determination of stylus velocity and three precise zones within which characters are analyzed. In Fujisawa U.S. Pat. No. 4,654,873, Mar. 31, 1987 disclose a pattern segmenter and analyzer that utilizes a number of hypothetical unit patterns (Col. 2, lines 5-8). At Col. 5, line 61 to Col. 6, line 36 there is described in relation to FIG. 9 a segmentation process and recognition process. Step 703 is said to show that a hypothetical boundary of characters is established based on information in an element attribute list 714 and a form dictionary 950. In Kuzunuki U.S. Pat. No. 4,680,804, July 14, 1987, disclose a method of designating either a character or a graphics recognition mode. In Shojima U.S. Pat. No. 4,718,103, Jan. 5, 1988, disclose a handwritten pattern recognition system that employs an angular variation between adjacent segments of a handwritten pattern and a dictionary having candidate patterns.

In Yoshida U.S. Pat. 4,764,972, Aug. 16, 1988, disclose a recognition system that employs a first memory for storing isolated characters and a second memory for storing interstroke character information. In U.S. Pat. No. 4,805,225, Feb. 14, 1989, D. Clark discloses a general purpose pattern recognition method and apparatus that includes learning and recognition modes and which is constructed of a plurality of basic feature recognizers.

In commonly assigned Fox U.S. Pat. No. 4,727,588, Feb. 23, 1988, disclose an electronic tablet and an all-points-addressable display to create handwritten images of documents which may be easily edited and subsequently stored within an information processing system.

In commonly assigned U.S. Pat. No. 4,731,857, Mar. 15, 1988, C. C. Tappert discloses a method that involves determining possible segmentation points of handwritten characters and passing all combinations of segments which may be a character to a character recognizer (Col. 3, lines 47-68). In relation to a Multi-Sort subroutine of FIG. 4 Tappert states that dictionary look-up and syntactic and semantic processing may be used to eliminate letterchain choices for which no valid word exists (col. 6, lines 45 et seq.). However, the type of syntatic and semantic processing envisioned by Tappert is a computationally expensive process that operates over all input strokes which, for even a relatively simple word, can be a potentially large number of stroke combinations. As such, this process of Tappert may not be suitable for real time character recognition if additional processing such as dictionary look-up is employed. Also, Tappert does not disclose the provision of selectable or switchable syntactic or semantic processing elements.

It is therefor an object of the invention to provide method and apparatus for providing constraint-driven recognition of on-line handwritten characters and symbols.

It is another object of the invention to provide method and apparatus to realize an efficient mechanism for constraint driven recognition as a combination of a stack algorithm and a series of cascaded filters, wherein each of the filters corresponds to one constraint.

It is another object of the invention to provide method and apparatus for providing an application program writer with a capability to dynamically activate and inactivate constraints applied to a character recognition task, thereby facilitating the processing of form applications.

It is a further object of the invention to provide methods to represent constraints in a form which provides an efficient method to verify constraints during character recognition.

SUMMARY OF THE INVENTION

The foregoing problems are overcome and the objects of the invention are realized by method and apparatus for identifying a valid symbol or a string of valid symbols from a sequence of handwritten strokes. In accordance with a method of the invention there are disclosed the steps of (a) generating in response to one or more handwritten strokes a plurality of stroke labels each having an associated score; (b) processing the plurality of stroke labels in accordance with a beam search-like technique to identify those stroke labels indicative of a valid symbol or portion of a valid symbol; and (c) associating together identified stroke labels to determine an identity of a valid symbol or a string of valid symbols therefrom.

The method includes an initial step of inputting x-y coordinate data from an electronic tablet, the x-y coordinate data being indicative of a handwritten stroke. The step of processing includes an initial step of storing the stroke labels within a stack data structure in order of score value, the stack data structure storing all or a portion of all paths through a search space defined by the plurality of stroke labels.

In accordance with a first method of the invention the step of processing is accomplished by the steps of (1.) reading a top path from the stack data structure; (2.) extending the top path with all possible successor stroke labels to form one or more extended paths; (3.) merging the extended paths into the search space as a function of score; and (4.) repeating from step (1.) until an end of input condition is reached.

In accordance with a second method of the invention the step of processing is accomplished by the steps of (1.) removing a top path from the stack data structure; (1.5) extending a younger sister path from a parent of the top-path; (1.6) merging the younger sister path back into the stack as a function of score; (1.7) sending the top path through at least one constraint validation filter; and, if the top path survives the filter, (2.) extending the top path with the best one among candidate stroke labels. The method further includes the steps of (3a.) merging the extended top path back into the stack with an associated FLAG=OPEN; (3b.) merging the original top-path back into the stack with an associated FLAG=CLOSED; and (4.) repeating the steps of the method from (1.) until an end of input condition is reached.

An important aspect of the invention is that each of the constraint validation filters is switchably coupled to the output of the stack and/or to the output of a previous filter. The switches function to either couple a filter blook input to a stroke label or decouple the input and provide a path around the filter block. In accordance with the invention an application writer has available a plurality of constraint filters. The application writer specifies which one or ones of the constraint filters are to be applied for a specific sequence of strokes.

The constraint filters may be validation-type or scoring-type and are selected by an application writer based upon the type of handwritten data expected to be processed by an application program. Different types of constraint filters include but are not limited to dictionary constraint filters, syntactic constraint filters, semantic constraint filters, stroke topology filters, n-gram constraint filters and variations and combinations thereof.

BRIEF DESCRIPTION OF THE DRAWING

The above set forth and other features of the invention are made more apparent in the ensuing Detailed Description of the Invention when read in conjunction with the attached Drawing, wherein:

FIG. 3c illustrates a search space that represents the stroke labels of FIG. 3a;

DETAILED DESCRIPTION OF THE INVENTION

Figure 1A:
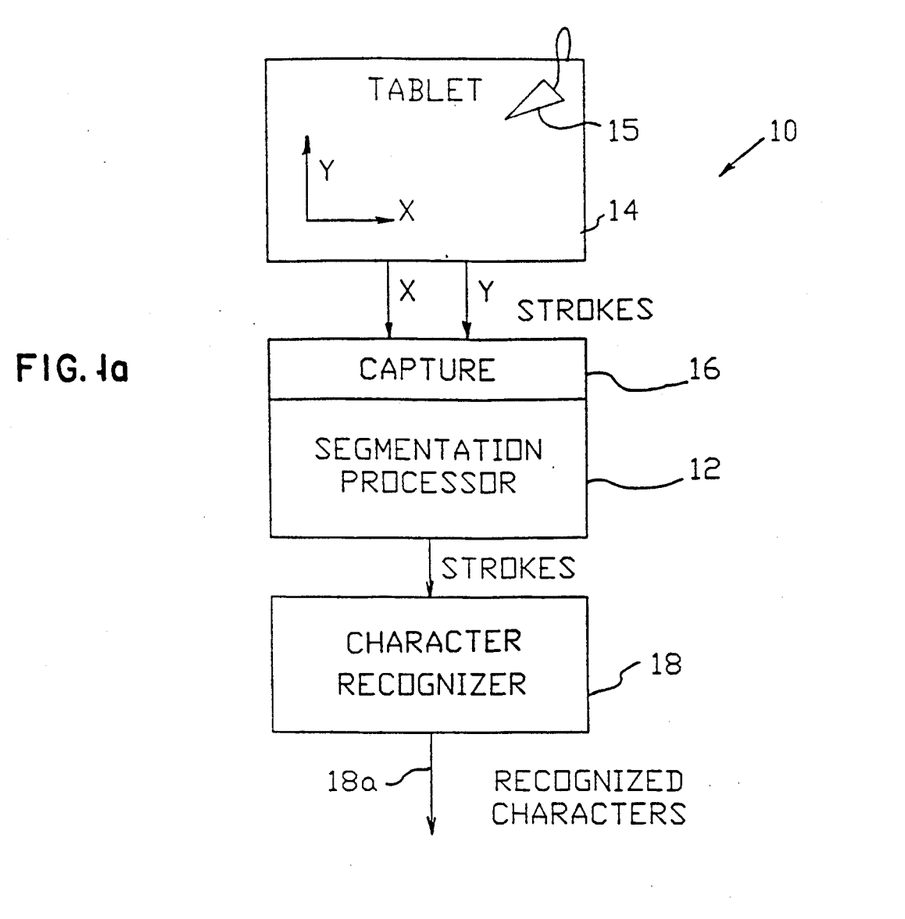
FIG. 1a is a block diagram of a handwriting recognition system constructed and operated in accordance with the teaching of the invention.

Referring to FIG. 1a there is shown in block diagram form a character recognition system 10 that includes a segmentation processor 12 coupled between an electronic tablet 14 and a character recognizer 18. Tablet 14 can be any of a number of suitable commercially available electronic tablets. The tablet 14 has an associated stylus or pen 15 with which, in a pen-down position, a user forms symbols, such as block printing or script alphanumeric characters, on a surface of the tablet 14. The tablet 14 has x-axis and y-axis output signals expressive of the position of the pen 15 on an x-y tablet coordinate system. A stroke capture means 16 may be a software task which intercepts the x-y outputs from the tablet to generate x-y position pair data for the segmentation processor 12. An output of the segmentation processor 12 is data expressive of connected strokes and unconnected strokes which is input to the character recognizer 18 of the invention. The character recognizer 18 operates to determine an identity of a connected group of segmented strokes and has an output 18a expressive of identified symbols such as alphanumeric characters.

In this regard it should be realized that the invention is applicable to the recognition of a number of hand-drawn symbols wherein a given symbol is composed of at least one segmented stroke. By employing the teaching of the invention the system 10 readily recognizes symbols associated with written characters of various languages and also mathematical and other types of symbols.

Figure 1B:
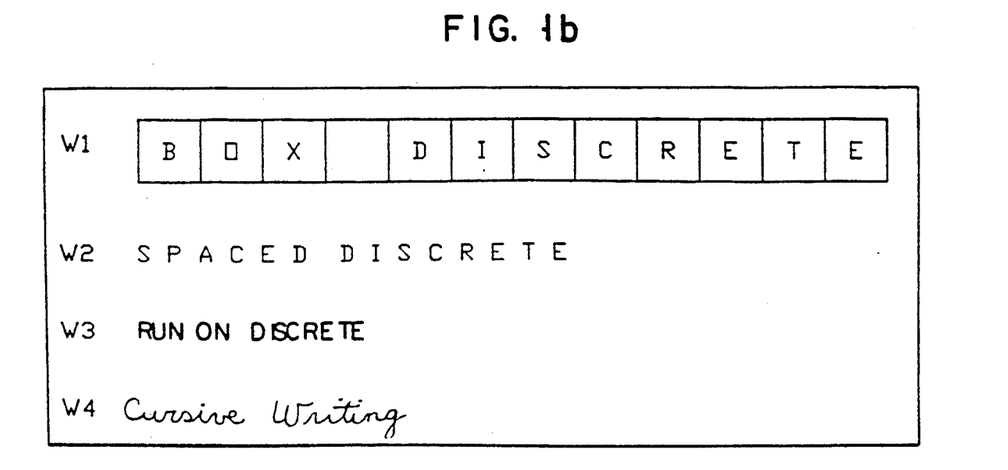
FIG. 1b illustrates various types (W1–W4) of handwritten characters that. are suitable for processing by the invention.

Although the teaching of the invention does not encompass the stroke segmentation process per se the use of the invention is applicable to various levels of segmentation processing that correspond to various levels of writings as shown in FIG. 1b. For example, in box discrete writing (W1) individual characters are written within defined boxes. In space discrete writing (W2), characters are written with an inter-character gap which is larger than any of the inter-stroke gaps within characters. In run-on writing (W3) characters may touch and overlap, but the pen 15 is lifted between characters. In cursive writing (W4) one stroke may span over several characters.

In order to process all of the four levels of writings in FIG. 1b at least two modes or levels of segmentation, S1 and S2, are considered.

(S1) Since the separation of characters in writings (W1) and (W2) can be performed by using spatial information, the role of segmentation is to group strokes into units of a character.

(S2) Since separation of characters in writings (W3) and (W4) cannot be readily accomplished using spatial information, the separation is accomplished using contextual information. As such, the role of segmentation is to reform (split) original strokes into pieces such that a stroke, after segmentation, never spans over characters.

As will be described below the teaching of the invention readily processes both cases. That is, if the segmentation processor 12 is working in the S1 mode, input to character recognizer 18 is a group of strokes which form a character. If the segmentation processor 12 is working in the S2 mode, the input to character recognizer 18 is a stroke segment of a character.

Figure 1C:
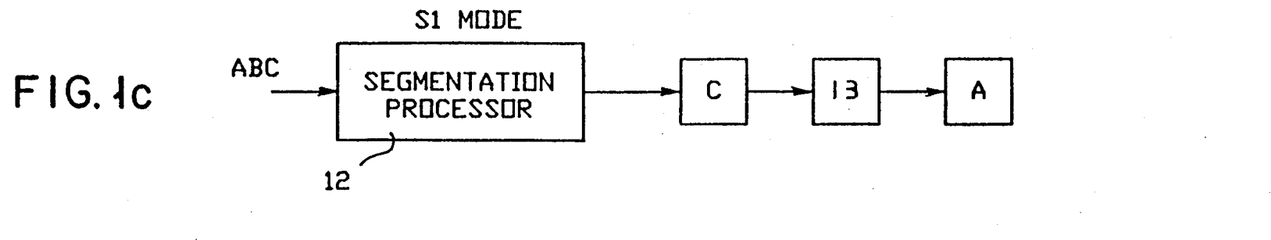
FIG. 1c illustrates an output of a segmentation processor working in a first mode (S1) of segmentation.
Figure 1D:
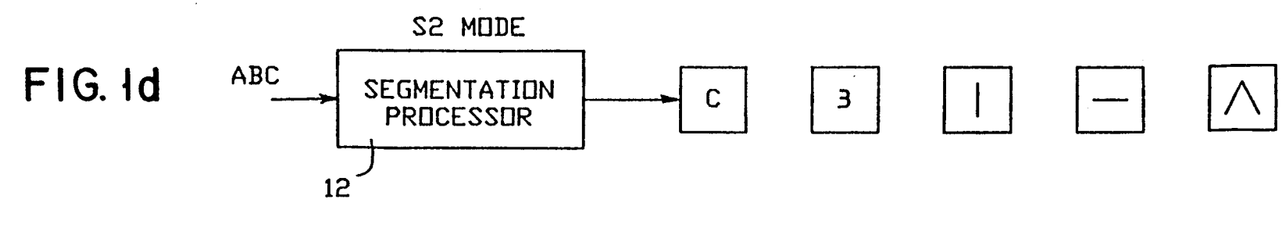
FIG. 1d illustrates an output of the segmentation processor working in a second mode (S2) of segmentation.

FIG. 1c shows a sequence of outputs from the segmentation processor 12 working in S1 and FIG. 1d the sequence of outputs when working in S2, both cases being a result of the character string "ABC" being written.

As is discussed in detail below the invention discloses method and apparatus for (A) providing constraint-driven recognition of on-line handwritten characters and symbols and (B) representing application dependent constraints in forms which realize efficient constraint-driven recognition. Discussion is first made of constraint-driven recognition.

As was previously noted the invention is applicable for use with at least two segmentation strategies, S1 and S2, which in turn operate on the four levels of writing W1, W2, W3, and W4 as shown in FIG. 1b. Depending on the segmentation strategy the input to character recognizer 18 is different. That is, for S1 the input is a group of strokes that form a character while for S2 the input is a stroke which is part of a character.

In that the S2 mode of segmentation is generally more robust the description of the invention is presented in the context of the S2 mode of segmentation, it being realized that the teaching of the invention is equally applicable to the S1 mode.

Figure 4:
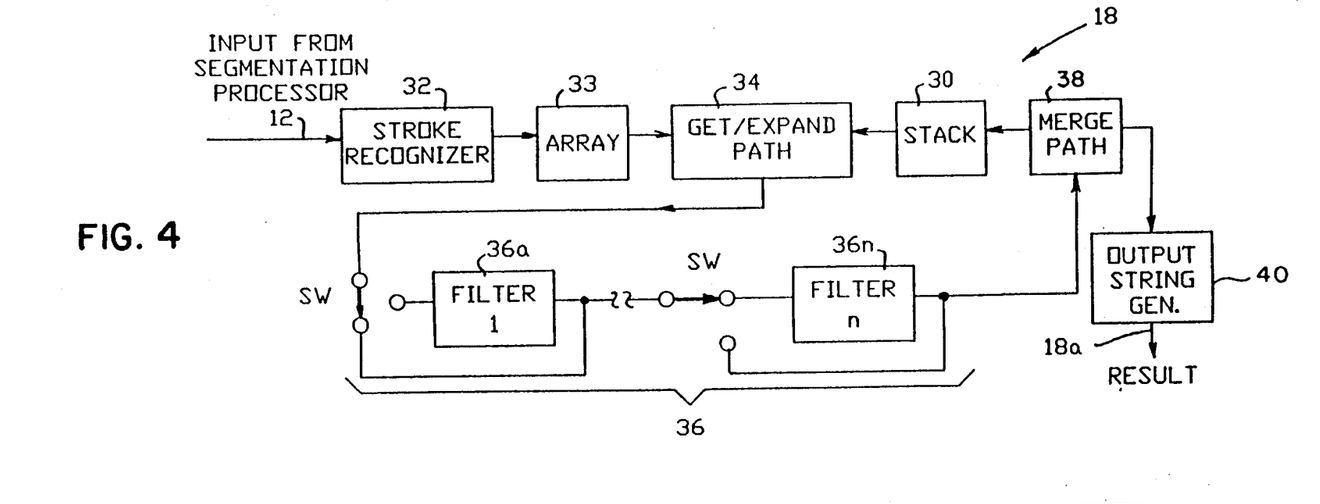
FIG. 4 is a block diagram that shows in greater detail the character recognizer 18 of FIG. 1 and in particular shows the cascaded, switchably connected constraint filters which are an aspect of the invention.

During the identification process carried out by Stroke Shape Recognizer 32 of FIG. 4 an input from segmentation processor 12 is compared with a set of stored templates each of which corresponds to a fragment of a character such as "1/2 A". As employed herein the convention for this notation "1/2 A" indicates the first stroke of two strokes (1/2) of the upper case character "A". Similarly, the notation "3/3 H" indicates the third stroke of three strokes of the character "H" while "1/1 C" indicates the first, and only, stroke of the upper case character "C". Each stroke label of the list also has associated therewith a "score" or value for indicating the degree of dissimilarity between the input stroke and one of the corresponding stroke templates.

Figure 3A:
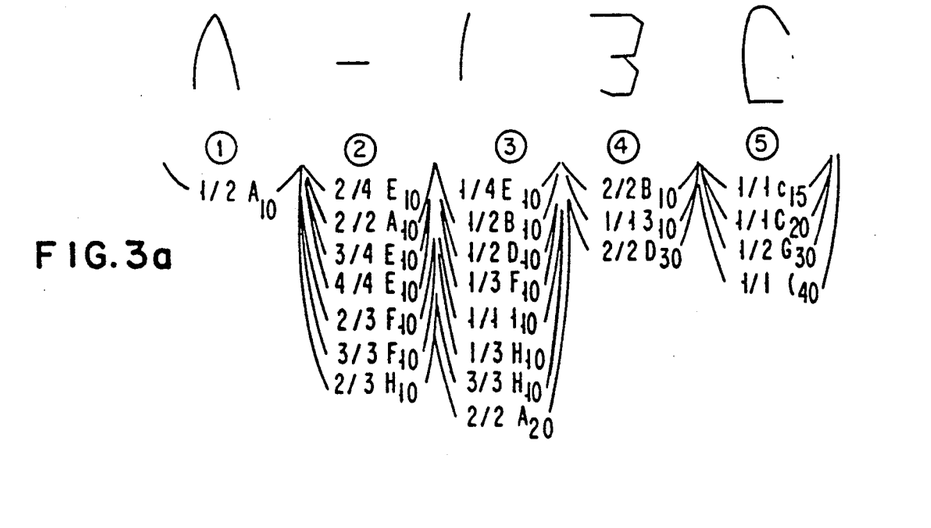
FIG. 3a illustrates a five stroke sequence (S1 mode) and the stroke labels and scores associated with each stroke.

The output from this process is shown in FIG. 3a. These scored labels are stored as a linked list in a storage array 33 of FIG. 4. Each stored score label also has associated therewith an index value, shown as a circled to which the stroke label(s) are associated. For example, there are seven stroke labels that have an index value of two and eight stroke labels that have an index value of three. That is, seven stroke labels are associated with the second received stroke and eight stroke labels are associated with the third received stroke. Also, as used herein the term "sister" or "sisters" indicates a relationship among those scored stroke labels having a common index value, that is, among those linked stroke labels occupying a same "column" in the storage array 33 of FIG. 4.

Figure 3B:
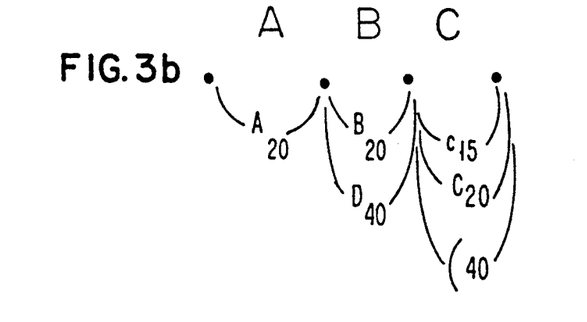
FIG. 3b illustrates possible characters and associated scores that are provided to the character recognizer when operating in the S2 mode.

It should be noted that the same process may be applied to the segmentation process working in the S1 mode. In that case, character templates are employed instead of stroke templates. Resulting labels are simply represented as "A", "B", "C", etc. The resultant scored labels for the S1 mode are shown in FIG. 3b. In that the remainder of the recognition processes are common to both the S1 and S2 segmentation strategies, explanations are given only for the more complex case of the scored labels as shown in FIG. 3a.

Figure 3C:
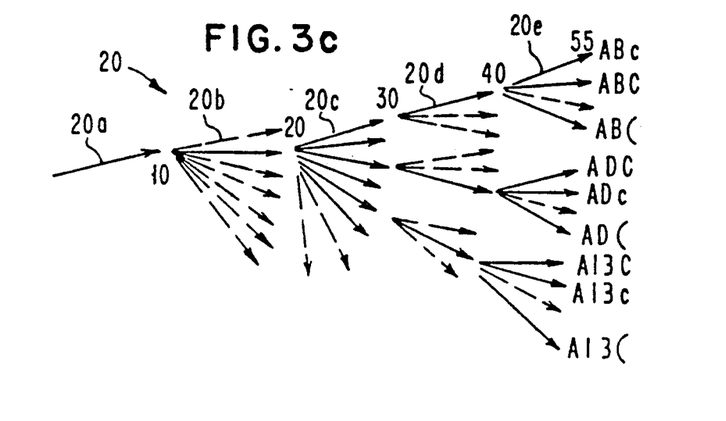

Based on the list of stroke labels associated with input strokes a hypothetical search space can be envisioned. As is seen in FIG. 3c this search space 20 contains all possible valid sequences of character fragments. For example, a sequence of "1/2 A", "2/2 A", "1/2 B", "2/2 B" and "1/1 c" corresponds to the branches labeled 20a, 20b, 20c, 20d and 20e and represents one valid path in the search space 20, the path corresponding to the string "ABc". In accordance with the invention paths in the search space 20 are ordered by score during processing such that the most-likely path is located at the "top" of the search space 20. As such, for the stroke sequence of FIG. 3a the character sequence "ABc" is determined to be the most likely character sequence due to its location at the "top" of the search tree 20. The paths associated with the nine valid character combinations depicted on the right side of the graph are shown as solid arrows in FIG. 3c while the branches found to be associated with invalid stroke combinations, such as the combination 1/2 A followed by 2/3 H, are shown as dashed arrows.

In this regard it is noted that the necessary portion of the search space FIG. 3c is preferably implemented in a memory as a stack 30 data structure, as shown in FIG. 4, wherein the input stroke labels are arranged by score, with the stroke label having the lowest score, or the best match between a stroke and the associated templates, at the top of the stack. The utility and significance of the stack 30 data structure is described in greater detail in reference to presently preferred stack processing procedures. Hereinafter the terms "stack" and "search space" are used interchangeably in that the stack 30 data structure represents a part or the whole of the search space.

A presently preferred stack processing method is based upon a search technique known in the art as a "beam search". One suitable beam search procedure is disclosed by N. J. Nilsson in "Problem Solving Methods in Artificial Intelligence", pages 54–59, McGraw Hill, 1971 where the beam search procedure is referred to as "algorithm A*" (page 59). Of course, the teaching of the invention is not to be construed to be limited to only this particular beam search or beam search-like technique.

Figure 6A:
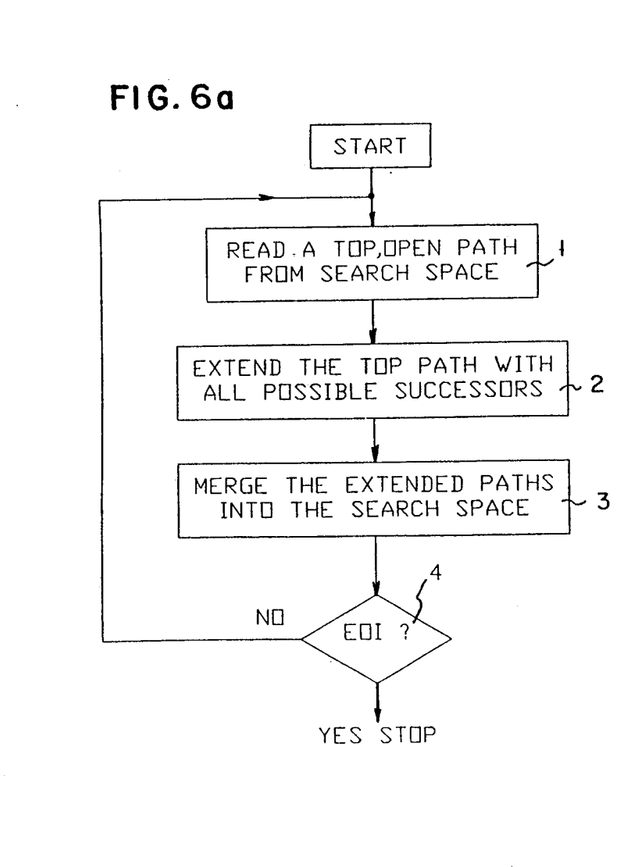
FIG. 6a is a flow chart illustrating the first method (Procedure 1) of the invention.

The ensuing description of Procedure is given in conjunction with the flow chart of FIG. 6a.

Procedure 1

1. Read a top-path from the stack. The top-path is marked "CLOSED" and is not read again.
2. Extend the top-path with all possible successors.
3. Merge the extended paths into the search space.
4. Repeat from step (1) until the End Of Input (EOI).

Figure 5A:
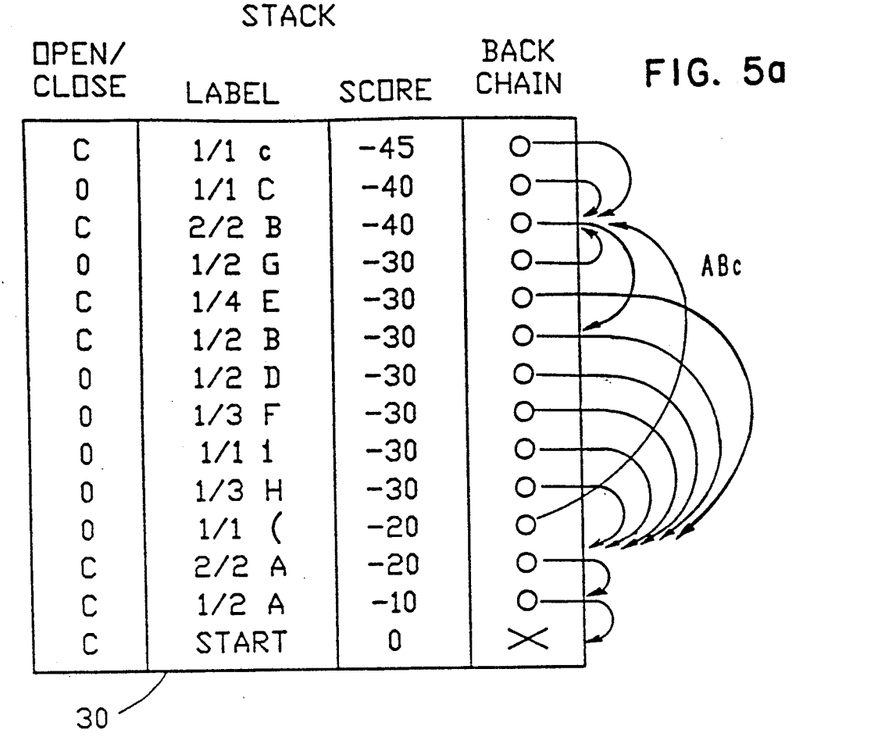
FIG. 5a illustrates a stack that is employed by the character recognizer of the invention for representing the search of FIG. 3c, the stack contents being depicted at the termination of operation of a first character recognition method (Procedure 1) of the invention.

Procedure 1 applied to the stroke sequence of FIG. 3a yields the following expanded sequence of steps wherein the numbers appearing within parenthesis ( ) correspond to the steps 1-4 of Procedure 1 above. Reference is also made to the content of the stack 30 depicted in FIG. 5a. In FIG. 5a each stack entry has five data fields, including OPEN/CLOSE, LABEL, SCORE, BACKCHAIN and an unillustrated data field INDEX. The INDEX field contains the corresponding index value when a particular stroke label is copied from the array 33 to the stack 30. By definition the START entry has an index value of zero. When a given path is extended or expanded the array 33 is accessed by the GET/EXPAND PATH block 34 of FIG. 4 to retrieve one or more stroke labels. Merging an extended path is accomplished by copying at least one stroke label from the array 33 to the stack 30.

Step #
1. (1) A "starter" entry is read from the stack 30. The stack 30 is by definition initialized with the START entry which has an index value of zero.
2. (2) The START entry is expanded with the stroke label '1/2A' which is read from the array 33. The resulting score is determined as (score=0 (score of "starter")+10 (score 1/2A)−20 (scorebias)=−10). The scorebias term is typically employed during a beam search to normalize the score.
3. (3) '1/2A' is merged into the stack.
4. (1) '1/2A' is read from the stack and is marked "CLOSED".
5. (2) '1/2A' is expanded with '2/2A' ('2/4E' cannot follow '1/2A'). The resulting score is determined to be (score=−10 (score of 1/2A)+10 (score of 2/2A−20 (scorebias)=−20).
6. (3) '2/2A' is merged into the stack.
7. (1) '2/2A' is read from the stack and is marked "CLOSED".
8. (2) '2/2A' is expanded with all possible successors 1/4E, 1/2B, 1/2D, 1/3F, 1/11 and 1/3H. It is noted that 3/3H and 2/2A are not valid possible successors to '2/2A'.
9. (3) All of these successor labels are merged into the stack 30 ordered by resulting score.
10. (1) '1/4E' is next read from the stack because the score of 1/4E is least amongst the scores of the sisters.
11. (2) There is nothing to extend '1/4E'. 1/4E is "killed" and is marked "CLOSED" on the stack.
12. (3) Nothing is added to the stack.
13. (1) '1/2B' is read from the stack because this score is presently the least among the stack elements which are presently OPEN.
14. (2) '1/2B' is extended with '2/2B'.
15. (3) '2/2B' is merged into the stack.
16. (1) '2/2B' is read from the stack and is marked "CLOSED".
17. (2) '2/2B' is extended with '1/1c', '1/1C', '1/2G' and '1/1('.
18. (3) All of these labels are merged into the stack.
19. (4) In that '1/1c' reaches to EOI the Procedure terminates with a stack configuration as shown in FIG. 5a.

The solution in this case is the character string "ABc".

Further in accordance with the invention the above described Procedure 1 is modified as described below to realize the additional benefits conferred by constraint-driven validation filtering.

Figure 6B:
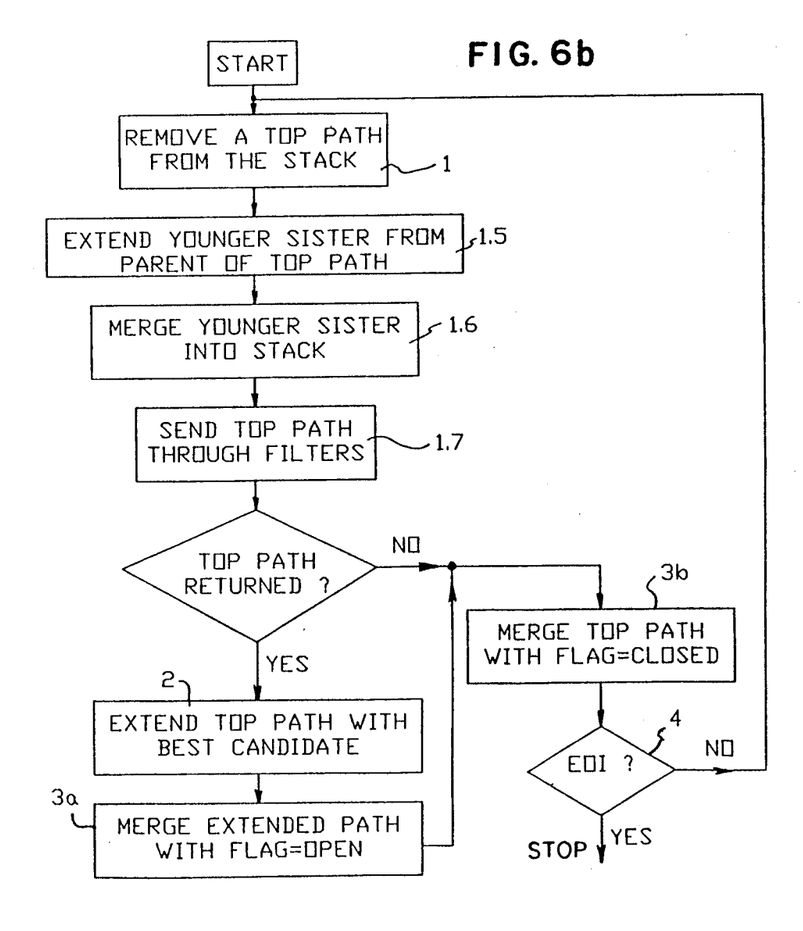
FIG. 6b is a flow chart illustrating the second method (Procedure 2) of the invention.

Referring to the flowchart of FIG. 6b the original step 2 of Procedure 1 is replaced with steps 1.5, 1.6, 1.7 and 2. Step 1.7 is employed to send the top path through cascaded constraint filters (36a–36n) of FIG. 4.

Figure 5B:
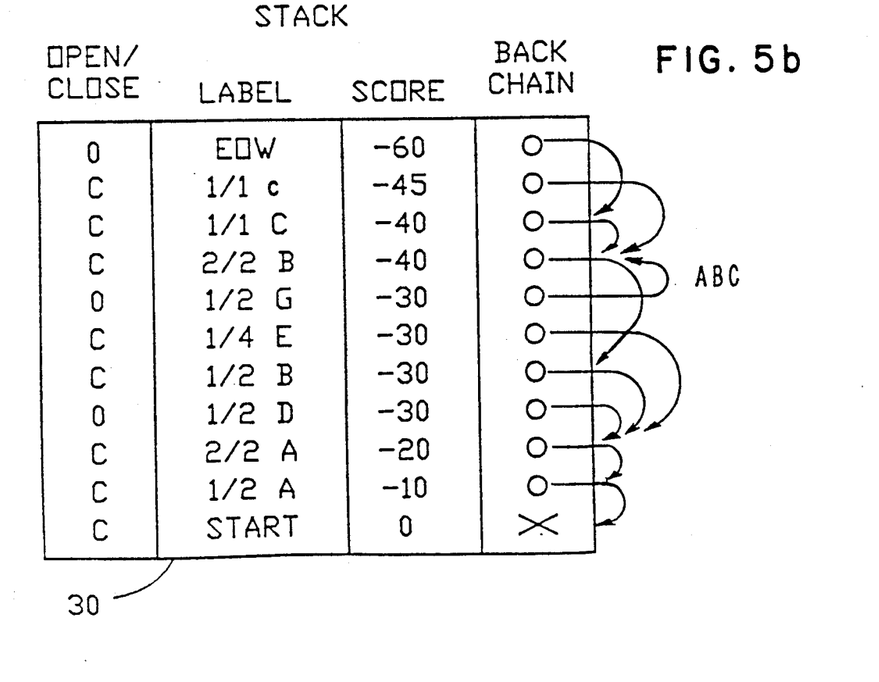
FIG. 5b also illustrates the stack, the stack contents being depicted at the termination of operation of a second character recognition method (Procedure 2) of the invention.

As can be seen from a comparison of the stack structures of FIGS. 5a and 5b Procedure 2 significantly reduces the number of stack items. That is, the size of expanded portion of the search is significantly reduced.

Procedure 2

Step #

1 Remove a top-path from the stack.
1.5 Extend a younger sister from the parent of the top-path.
1.6 Merge the younger sister into the stack.
1.7 Send the top-path through the cascaded constraint filters 36 (filter pipe).

As a result of the execution of Step 1.7 three results or cases may occur.

Case A) A filter 36 may eliminate the top-path when the path violates the constraint represented by the filter. In this case nothing is returned from the filter(s).
Case B) A filter may penalize the top-path. In this case the top-path is returned but the associated score is increased (penalized).
Case C) The top-path validates every constraint filter. The top-path is returned without any change to the associated score.

2. Extend the top-path, if returned from the filter, with the best one, or most probable, among candidate stroke labels. If the top-path does not survive do nothing in this step.
3a. Merge the extended top-path into the stack with FLAG=OPEN.
3b. Merge the original top-path into the stack with FLAG=CLOSED.
4. Repeat the steps of the procedure from (1) until EOI.

The aforedescribed processing of the search space representing the string "ABC" is now repeated in the context of the revised stack processor embodied by Procedure 2. For this description it is assumed that a syntax constraint filter 36, of a type described in detail below, is switched into the filter pipe and receives the paths sent through the pipe. This type of constraint filter is employed to validate transitions of upper case and lower case letters. The use of the syntax constraint filter advantageously rejects those combinations of characters such as "WORd" and "WOrd" while verifying combinations such as "Word" and "WORD". The numbers appearing in parenthesis ( ) refer to the step numbers of Procedure 2.

Step #
1. (1) The START entry is removed from the stack.
2. (1.5) There is no younger sister for START.
3. (1.6) Nothing is merged to the stack.
4. (1.7) START by definition is verified by all constraint filters.
5. (2) Access the array 33 and extend START with the stroke label '1/2A'.
6. (3) Merge '1/2A' and START to the stack.
7. (1) '1/2A' is removed from the stack.
8. (1.5) There is no younger sister.
9. (1.6) Nothing is merged to the stack.
10. (1.7) '1/2A' is verfied by the constraint filter(s).
11. (2) Extend '1/2A' with '2/2A'. '2/4E' cannot follow '1/2A' in that a low level constraint would be violated.
12. (3) Merge '1/2A' and '2/2A' to the stack.
13. (1) '2/2A' is removed from the stack.
14. (1.5) There is no sister of '2/2A' which can follow '1/2A'. Nothing is extended.
15. (1.6) Nothing is merged into the stack.
16. (1.7) '2/2A' verifies the constraint filters.
17. (2) Extend '2/2A' only with '1/4E', as compared to step #8 of the expanded Procedure 1 above.
18. (3) Merge '2/2A, and '1/4E' to the stack.
19. (1) '1/4E' removed from the stack.
20. (1.5) '1/2B', the sister of 1/4E, is extended from '2/2A, which is the parent of '1/4E'.

21. (1.6) '1/2B' is merged into the stack.
22. (1.7) '1/4E, is verified by the constraint filters.
23. (2) There is nothing to extend '1/4E'.
24. (3) '1/4E, is merged back into the stack with flag=-CLOSED.
25. (1) '1/2B' is removed from the stack.
26. (1.5) '1/2D', the sister of 1/4E, is extended from '2/2A', which is the parent of '1/2B'.
27. (1.6) '1/2'D is merged into the stack.
28. (1.7) '1/2B' is verified by the constraint filters.
29. (2) Extend '1/2B' with '2/2B,
30. (3) Merge '1/2B' as "CLOSED", '2/2B' as "OPEN" to the stack.
31. (1) '2/2B' is removed from the stack.
32. (1.5) There is no sister of '2/2B' which can follow '1/2B'.
33. (1.6) Nothing is added to the stack.
34. (1.7) '2/2B' is verified by the constraint filters.
35. (2) Extend '2/2B' with '1/1c'.
36. (3) Merge '2/2B, as "CLOSED" and '1/1c' as "OPEN" to the stack.
37. (1) '1/1c' is removed from the stack.
38. (1.5) '1/1C', the sister of 1/1c, extends '2/2B, (parent of 1/1c).
39. (1.6) '1/1C' is merged into the stack.
40. (1.7) '1/1C' does not verify the syntax constraint filter. This is because this path represents a sequence, 1/2A, 2/2A, 1/2B, 2/2B, 1/2c (upper case letter) (uppercase letter) (lower case letter), which by definition is not permitted by the syntax constraint filter. That is, a lower case character is not permitted to follow two upper case characters. As a result the path is killed.
41. (2) Nothing is extended.
42. (3) Nothing is merged to the stack.
43. (1) '1/1'C' is removed from the stack.
44. (1.5) '1/2G' (sister of 1/1C) extends '2/2B' (parent of 1/1C).
45. (1.6) '1/2G' is merged in the stack.
46. (1.7) '1/1C' is verified by the constraint filter.
47. (2) '1/1C' is extended with EOI.
48. (3) Merge '1/1C' as "CLOSED" and EOI as "OPEN".
49. (1) EOI is removed from the stack.

Terminate the procedure when EOI is removed from the stack 30.

As can be readily seen when comparing the stack structures of FIGS. 5a and 5b the method of Procedure 2 not only returns the correct result "ABC", as opposed to "ABc", but also provides greater execution speed efficiency because Procedure 2 expands a smaller portion of the search space. That is, the data structure of FIG. 5b can be seen to be more compact than the data structure of FIG. 5a.

Further in accordance with the invention the constraint filters 36 are switchably connected into the constraint filter pipe. Thus a particular filter is activated when desired by the application program writer. For example, in the PART # field of FIG. 2 a lower case character following two or more upper case characters may be a valid character string for expressing a part number such as "PNa2345c". In this case, the application writer would switch out the syntax constraint filter when processing input from the PART # field while switching the filter back in again when processing input from the SALESMAN data field. As will be pointed out below certain of the filters 36 may be switched in and out automatically as a function of some variable or state associated with the character recognition task.

As such, and further in accordance with the invention, constraint-driven recognition is realized by including a constraint-validation loop within the character recognizer 18. One embodiment of the character recognizer 18 constructed and operated in accordance with Procedure 2 is shown in FIG. 4.

Validation of the path, or interim recognition, is performed by the cascaded constraint filters 36. Surviving paths are reordered and merged back into the stack 30 as a function of score by a Merge Path block 38 that executes Step #3 of Procedure 2. The merging operation also involves providing a backward pointer to a previous stack entry in order to chain a particular stroke label into the search space. After all input strokes are processed an Output String Generator 40 backchains through the stack to select and output the result 18a. It can be appreciated that certain of the steps of Procedure 1 can be approximated by placing all of the switches in an open position for shorting around all of the filter blocks 36. This latter approach does not, however, provide identical operation in that step 2 of Procedure 1 is extended to step 1.5 of Procedure 2.

When a lowest scored path is removed from the search space it is sent to the cascaded constraint filters 36 for validation (Step 1.7 of Procedure 2). Each of the constraint filters 36a-36n corresponds to one constraint. For example, one of the filters 36 processes the stroke label in accordance with application-dependent word syntax, another of the filters 36 processes the stroke label in accordance with general word syntax, another processes the stroke label in accordance with an extensive list of application-dependent words while another of the filters may process the stroke label in accordance with statistically related n-grams.

Figure 7:
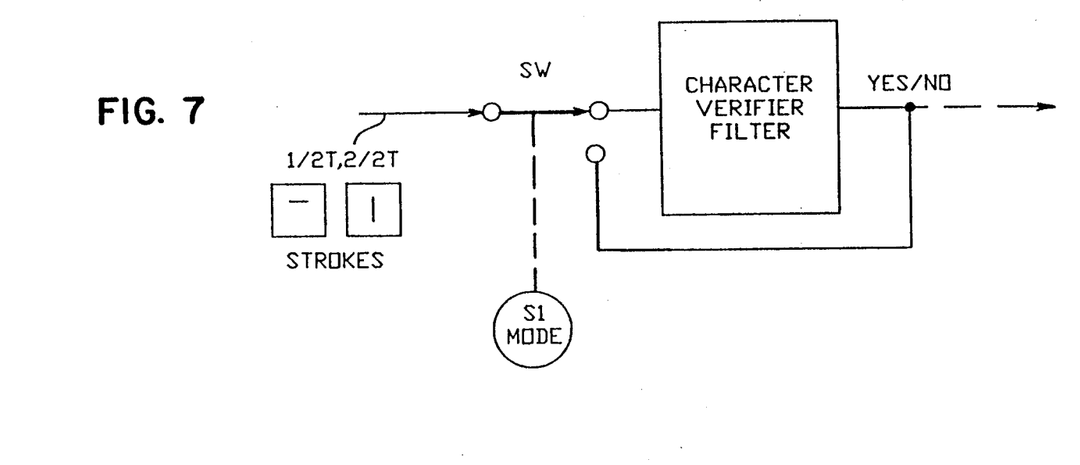
FIG. 7 shows in greater detail a representative constraint validation filter that is switchably coupled into the cascaded constraint filter pipe.

If the segmentation processor 12 is working in the S2-mode of operation a filter which verifies the inter-stroke topological relationship is generally required as one of the cascaded constraint filters. This is to avoid confusion among characters which have the same shape strokes as constituents. For instance, this filter will prevent confusions between "+" and "T"; and between "F" and "I". Conventional character matchers, either template matching based or feature analysis based, can be used as one of the filters for this purpose as shown in FIG. 7. In the case of FIG. 7 the character verifier filter is activated, or switched-in automatically, when the S1 mode of operation is entered.

As can be seen in FIG. 4 an aspect of the invention is that each of the filters 36 is switchably coupled to the output of the Get Path block 34 and/or to the output of a previous filter. The switches (SW) are shown schematically as single pole/double pole switches which either couple a filter block input to a stroke label or decouple the input and provide a path around the filter block. In accordance with the invention an application writer has available a plurality of constraint filters 36a-36n. The application writer specifies which one or ones of the constraint filters 36 are to be applied for a specific sequence of strokes.

In general, the larger the number of constraints associated with an input, the more accurately and efficiently does the recognition process occur. The use of constraints is especially advantageous for a writer of a character recognition application when handwritten symbol recognition is coupled with "fill-in-form" type documents in that each write-in-field of such a document generally has an associated set of allowable words and symbols. In this regard a restriction for allowable words can be described as a set of constraints, e.g. a set of rules and/or a list of words that is used to facilitate the recognition process.

Figure 2:
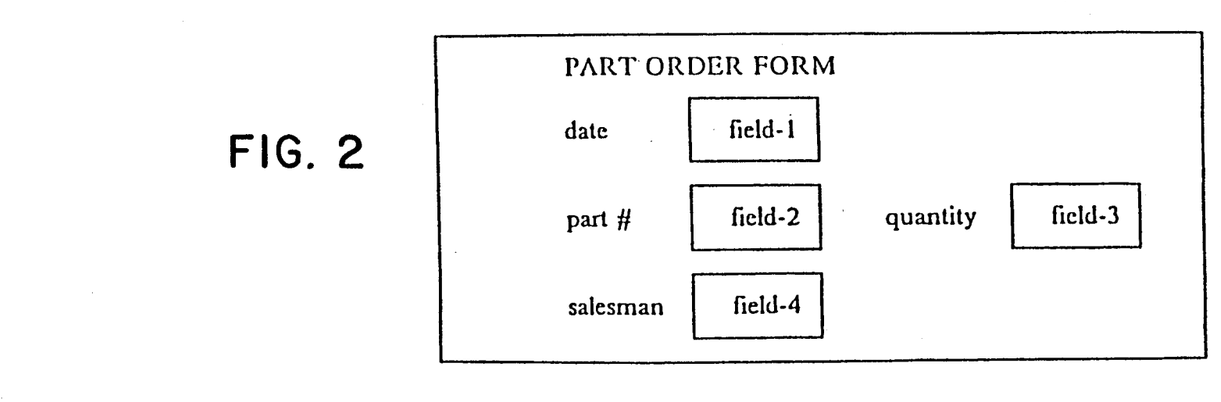
FIG. 2 illustrates an exemplary form having fill-in fields of a type suitable for processing by the invention.

FIG. 2 illustrates a typical "fill-in-form" type document. For each write-in-field, application dependent constraints for allowable values are identified. By example, for the form shown in FIG. 2 the following constraints on the valid content of each of the Fields can be defined as follows.

| Field-1: | allowable characters = <digit>,"/" |
| | word syntax = <digit> <digit>/<digit> |
| | <digit>/<digit> <digit> |
| Field 2: | allowable characters = <digit>, "-" |
| | word syntax = P <digit>-<digit> |
| | <digit><digit><digit> |
| | word list = name of the file which contains |
| | extensive list of part numbers such as P7-0324, |
| | P1-2588. |
| Field 3: | allowable characters = "digit" |
| | word syntax = <digit . . . |
| Field 4: | allowable characters = "alphabet" |
| | word syntax = <upper case>. . . \| <upper case> |
| | <lower case> . . . |
| | word list = name list of sales personnel such |
| | as "John" or "Mary". |

Using the example of FIG. 2 one specific combination of filters 36 is specified for processing the strokes associated with the date field (Field-1) while another combination of filters 36 is specified for processing the strokes associated with the part number data field (Field-2).

By example, five types of rule-driven constraint filters 36 may reside in a library of constraint filters that are available to the application writer. Also, as described below the application writer defines a rule or rules pertaining to a sequence of strokes and a corresponding constraint filter is applied to the associated strokes.

One possible type of constraint filter is based on general word and/or application-dependent word dictionaries. Such dictionaries are generally used in two ways. Dictionaries may be employed to validate the recognition results when recognition of words is complete. That is, those character strings recognized as words are passed through the dictionary filters to validate the recognition result. Also, the dictionary filter can be used to validate interim word recognition results by detecting combinations of N-characters which do not exist in the dictionaries. Thus, early pruning of invalid character strings and words from the search space is accomplished.

In the example of FIGS. 5a and 5b if the strokes were associated with, for example, the salesman name field (Field-4) of FIG. 2 a digit would be considered an inappropriate character. As such, if the application programmer specifies that the partial character strings "AB", "AD" and "A13" be applied to such a dictionary filter the string "A13" would not survive.

The dictionary filter is driven by a table that includes word, either full or interim, entries. A string of character recognition results, final or interim, is matched against the entries of this table.

For example, when the top path shown in FIG. 5(b) is provided to the dictionary constraint filter the sequence of:

| START | A | B | C | EOW |
|---|---|---|---|---| is forced by traversing the stack back-chain and comparing with entries in the table.

Each of the dictionary table entries is associated with a flag that indicates whether the entry is a full word or an interim word. If specified as a full word, verification against this entry is accomplished only when the path reaches to the end of a word. The flag also indicates whether the entry is a negative word or a positive word. A positive word indicates that the word listed in the table is valid as a full/or as an interim word. A negative word indicates that the spelling given in the table is invalid. Any path containing this spelling is killed.

Another possible type of constraint filter, especially useful as a scoring-type filter, is based on word n-gram statistics and character n-gram statistics and is employed for verifying character triplets. By example, the string "que" would be found to have a greater frequency of occurrence than the string "qae". As a result, if both strings were applied to an n-gram filter the score of the "que" string would not be altered whereas the string associated with the string "qae" would be penalized and the associated score increased. In use the characters are put through the filter in triplets. Furthermore, special start and stop characters (represented here by _) are inserted at the assumed beginning and at the assumed end of the word. As an example, the word "WORK" is partitioned and put through the n-gram filter as the triplets "_W", "_WO", "WOR", "ORK" and "RK_".

This type of filter works with a table containing entries each of which includes a character triplet and a penalty score. When a path is given to this filter, a triplet consisting of the last three characters are formed and examined.

In the case of top path of FIG. 5b, a triplet "BC_" is formed. If the triplet does not exist in the table, the path is killed. If the triplet exists in the table, the score associated with the matching entry is added to the score of the path. This table can readily be made from an arbitrary word list. To determine the correct score may be difficult to accomplish, however, this filter is effective even if all scores are set to 0. For example the following entries would be generated from a list of words include TOM, JIM, BOB, MARY, BETTY and JIMMY.

| | | |
|---|---|---|
| start | start | B |
| start | start | J |
| start | start | M |
| start | start | T |
| start | B | E |
| start | B | O |
| start | J | I |
| start | M | A |
| start | T | O |
| B | E | T |
| B | O | B |
| J | I | M |
| M | A | R |
| T | O | M |
| A | R | Y |
| E | T | T |
| I | M | EOW |
| I | M | M |
| O | B | EOW |
| O | M | EOW |
| M | EOW | EOW |
| M | EOW | EOW |

-continued

| | | |
|---|---|---|
| M | M | Y |
| R | Y | EOW |
| T | T | Y |
| Y | EOW | EOW |
| M | Y | EOW |
| T | Y | EOW |

Another possible type of constraint filter was discussed above in the example given for the operation of Procedure 2 and is based upon syntax constraints for general words of English. The syntax constraint filter is typically employed for character type transition verification.

By example a table derived from the rules set forth below checks transitions of types of characters in words such that paths containing invalid transitions are penalized. In the rules <upper-word> and <lower-word> indicate a word comprised of upper case <upper character> and of lower case <lower character> characters, respectively.

```
<word>       = <upper-word> OR <lower-word>
<upper-word> = <upper character> OR <upper-word>
               AND <upper character>
<lower-word> = <lower character> OR <upper-character>
               AND <upper character> OR
               <lower-word> AND <lower character>
```

This kind of filter is driven by a table similar to that described above for verifying character triplets.

That is, each entry of the table includes a character triplet and a penalty score. However the meanings of the characters in the triples are different. The characters in triplets represent the type of characters in the input.

| | |
|---|---|
| U | represents upper case alphabet character such as 'A', 'B', 'C', ... 'Z'. |
| L | represents lower case alphabet characters such as 'a', 'b', 'c', ... 'z'. |
| D | represents digits such as '1', '2', ,., '9', '0'. |
| P | represents punctuation marks such as '.' and ',' |
| S | represents other special characters. |

With these representations, valid syntax for English upper words and lower words are represented by 13 triplets of this representation. These 13 triplets are preferably assigned with zero penalty.

| | | | |
|---|---|---|---|
| <word> = | start | start | U |
| | start | U | U |
| | start | U | eow |
| | U | U | U |
| | U | U | eow |
| | U | eow | eow |
| | start | start | L |
| | start | L | L |
| | L | L | L |
| | L | L | eow |
| | L | eow | eow |
| | start | U | L |
| | U | L | L |
| | U | L | eow |

When a path is given to this filter, a triplet consisting of character types of the last three characters are formed and verified with the table.

For example, if the path containing 'ABc" is given to this filter, a triple 'UUL' will be formed and will be tested against this table. Since UUL is not in the 13 triplets shown above, the path is eliminated.

Further in accordance with the invention constraint validation filters for verifying complex syntactical constructions are also readily employed.

Referring again to the example document of FIG. 2 a constraint derived from the rule shown below checks transitions of types of characters in the Part # field (Field-2) such that any path not adhering to the rule can be assumed to contain invalid transitions and can be penalized. Rules relating to each type of constraint can be formalized for implementing each constraint filter 36.

That is, the application writer may define a complex arbitrary syntax such as:

| |
|---|
| RULE: <part number> = 'P' <digit> '-' <digit> <digit> <digit> <digit> |

As another example, a rule to impose constraints for mathematical expressions such as (3+4−(A+B/62)) can also be readily provided.

These constraints may be approximated by the character type triplets described above. However, these constraints are precisely represented as entries in a table including an input state, character, an output state, and an end flag. For example, the valid forms of <part number> are represented by the following eight rules.

| Input State | Character | Output State |
|---|---|---|
| 0 | P | 1 |
| 1 | <digit> | 2 |
| 2 | - (hyphen) | 3 |
| 3 | <digit> | 4 |
| 4 | <digit> | 5 |
| 5 | <digit> | 6 |
| 6 | <digit> | 7 |
| 7 | <eow> | 0 |

In order to drive this table, stack entries as shown in FIG. 5b also include storage for the current state parameter. Current state is set to zero initially. If a path end having a state (i) is to be expanded with a character (C) the table is searched for the combination of (i, C). If it exists, the state of the extended path is set to the output state number appearing in the output state position of the matched table entry.

Another type of constraint validation filter is a filter to examine inter-stroke topological relationships. This filter is normally required only when S-2 type segmentation is performed. This filter is invoked, or switched in to the constraint-validation loop, when a character ends on a path. The last character of the path is sent to the filter in conjunction with the constituent strokes. If the topological relationships of strokes match what is expected from the hypothesized character, the character is verified. Any suitable character matching algorithm can be employed for this purpose.

Based on the foregoing it should be realized that the teaching of the invention is not limited for use with any one particular type of application such as with an input form having fill-in fields. Neither is the teaching of the invention limited for use with only the types of constraint filters referred to above. Thus, while the invention has been particularly shown and described with respect to a preferred embodiment thereof, it will be understood by those skilled in the art that changes in form and details may be made therein without departing from the scope and spirit of the invention.

Having thus described my invention, what I claim as new, and desire to secure by Letters Patent is:

1. A method for identifying a valid symbol or a string of valid symbols from a sequence of handwritten strokes comprising the steps of:
   generating, in response to one or more handwritten strokes, a plurality of stroke labels each having an associated score; and
   processing the plurality of stroke labels to identify stroke labels indicative of a valid symbol or portion of a valid symbol, the step of processing including the steps of
      storing the stroke labels within a data structure by order of score, the data structure storing all or a portion of all paths through a search space defined by the plurality of stroke labels; and
      reading a path from the data structure, extending the path with possible successor paths, and merging the extended paths back into the data structure as a function of score.

2. A method as set forth in claim 1 wherein the step of generating includes an initial step of inputting x-y coordinate data from an electronic tablet means, the x-y coordinate data being indicative of a handwritten stroke.

3. A method as set forth in claim 1 wherein the step of extending includes a step of evaluating the path with at least one constraint validation filter.

4. A method as set forth in claim 1 wherein the step of processing further includes the steps of:
   1.) reading a top path from the data structure;
   2.) extending the top path with all possible successor stroke labels to form one or more extended paths;
   3.) merging the extended paths into the search space as a function of score; and
   4.) repeating from step (1.) until an end of input condition is reached.

5. A method as set forth in claim 1 wherein the step of processing further includes the steps of:
   1.) removing a top path from the data structure;
   1.5) extending a younger sister path from a parent of the top-path;
   1.6) merging the younger sister path back into the stack as a function or score;
   1.7) sending the top path through at least one constraint validation filter;
   if the top path survives the filter,
   2.) extending the top path with the best one among candidates returned from the constraint validation filter;
   3a.) merging the extended top path back into the data structure with an associated FLAG=OPEN;
   3b.) merging the original top-path back into the data structure with an associated FLAG=CLOSED; and
   4.) repeating the steps of the procedure from (1.) until an end of input condition is reached.

6. A method as set forth in claim 5 wherein as a result of the execution of Step 1.7 a plurality of possible results are obtained, including:
   (a) the constraint validation filter eliminates the top path when the path violates the constraint represented by the constraint validation filter;
   (b) the constraint validation filter penalizes the score associated with the top path; and
   (c) the constraint validation filter validates the top path such that the score associated with the top path is unchanged.

7. A method as set forth in claim 4 wherein the step of merging includes a step of providing a pointer to another entry in the data structure.

8. A method as set forth in claim 5 wherein the steps of merging each include a step of providing a pointer to another entry in the data structure.

9. A method as set forth in claim 1 wherein the step of processing includes an initial step of specifying for use one or more constraint validation filters selected from the group consisting of dictionary constraint filters, syntactic constraint filters, semantic constraint filters, stroke topology constraint filters, n-gram constraint filters and variations and combinations thereof.

10. Apparatus for identifying a valid symbol or a string of valid symbols from a sequence of handwritten strokes comprising:
    means for generating, in response to one or more handwritten strokes, a plurality of stroke labels each having an associated score; and
    means for processing the plurality of stroke labels to identify stroke labels indicative of a valid symbol or portion of a valid symbol, the means for processing comprising
       means for storing the stroke labels within a data structure by order of score, the data structure storing all or a portion of all paths through a search space defined by the plurality of stroke labels; and
       means for reading a path from the data structure, means for extending the path with possible successor paths, and means for merging extended paths back into the data structure as a function of score.

11. Apparatus as set forth in claim 10 wherein the means for generating includes means for inputting x-y coordinate data from an electronic tablet means, the x-y coordinate data being indicative of a handwritten stroke.

12. Apparatus as set forth in claim 10 wherein the means for processing includes at least one constraint validation filter means.

13. Apparatus as set forth in claim 10 wherein the means for processing further comprises:
    means for reading a top path from the data structure;
    means for extending the top path with all possible successor stroke labels to form one or more extended paths; and
    means for merging the extended paths back into the data structure as a function of score.

14. Apparatus as set forth in claim 13 and further including one or more constraint validation filters switchably coupled in series between the extending means and the merging means and wherein the means for extending is comprised of:
    means for extending a younger sister path from a parent of the top-path;
    means for merging the younger sister path back into the data structure as a function of score;
    means for directing the top path through the at least one constraint validation filter; and
    means for extending the top path with a most probable one of the paths returned from the constraint validation filter.

15. Apparatus as set forth in claim 14 wherein the at least one constraint validation filter is selected from the group consisting of dictionary constraint filters, syntactic constraint filters, semantic constraint filters, stroke topology constraint filters, n-gram constraint filters and variations and combinations thereof.

16. A method for identifying a valid symbol or a string of valid symbols from a sequence of handwritten strokes comprising the steps of:
generating in response to one or more handwritten strokes a plurality of stroke labels each having an associated score;
storing the stroke labels within a first data structure; and
processing selected ones of the plurality of stored stroke labels with one or more constraint validation filter means to identify those stored stroke labels indicative of a valid symbol or portion of a valid symbol, the step of processing including a step of storing within a second data structure those stored stroke labels identified to be indicative of a valid symbol or portion of a valid symbol.

17. A method as set forth in claim 16 wherein the step of storing within a second data structure includes a step of storing within a stack data structure all or a portion of all paths through a search space defined by the plurality of stroke labels.

18. A method as set forth in claim 17 wherein the step of processing includes a step of inputting a selected one of the stored stroke labels to at least one of the constraint validation filter means, the step of inputting including a step of determining if the inputted stroke label is validated or invalidated by the at least one constraint validation filter means, and further includes a step of increasing the score associated with the inputted stroke label by an amount within a range of zero to some positive value, the amount being a function of whether the inputted stroke label is validated or invalidated by the constraint validation filter means.

19. A method as set forth in claim 18 and including a step of merging a processed stroke label into the stack data structure at a position that is a function of a modified score of the processed stroke label.

20. A method as set forth in claim 19 wherein the step of merging includes a step of providing a pointer to another stroke label stored in the stack data structure.

21. A method as set forth in claim 16 wherein the step of processing includes an initial step of specifying for use one or more constraint validation filters selected from the group consisting of dictionary constraint filters, syntactic constraint filters, semantic constraint filters, stroke topology constraint filters, n-gram constraint filters and variations and combinations thereof.

22. A method as set forth in claim 16 wherein the step of storing the stroke labels within a first data structure includes a step of forming a linked list of stroke labels associated with each handwritten stroke.

23. A method as set forth in claim 1 wherein the step of generating a plurality of stroke labels includes the steps of:
comparing a handwritten stroke to a plurality of stroke templates to identify a symbol or symbols of which the handwritten stroke may be a constituent; and
associating the handwritten stroke with a specific constituent stroke of each identified symbol.

24. A method as set forth in claim 23 wherein the associated score is assigned a value that is a function of a degree of correlation between the handwritten stroke and a stroke template corresponding to the identified symbol.

25. A method as set forth in claim 24 wherein the step of generating includes a step of ordering the stroke labels by order of associated score.

26. A method as set forth in claim 23 wherein the step of associating the handwritten stroke with a specific constituent stroke of each identified symbol includes a step of determining a stroke label having the form (m/nC), where C is the identified symbol, where m is indicative of a number of a specific stroke out of a sequence of strokes that comprise C, and wherein n is indicative of a total number of strokes in the sequence of strokes.

27. A method for identifying a valid symbol from a sequence of handwritten strokes, for each handwritten stroke the method comprises the steps of:
comparing a handwritten stroke to a plurality of stroke templates to identify a symbol or symbols of which the handwritten stroke may be a constituent;
associating the handwritten stroke with a portion of each identified symbol to form a stroke label;
assigning a score to each stroke label, the score having a value that is a function of a degree of similarity between the handwritten stroke and the stroke template corresponding to the identified symbol;
ordering the stroke labels associated with the handwritten stroke by order of score; and
processing the stroke labels associated with the handwritten stroke by determining which stroke labels, if any, when combined with stroke labels associated with a subsequently written handwritten stroke, comprise a valid symbol or a portion of a valid symbol.

28. A method as set forth in claim 27 wherein the step of processing includes an initial step of storing the stroke labels within a data structure by order of score value, the data structure storing all or a portion of all paths through a search space defined by the stroke labels.

29. A method as set forth in claim 28 wherein the step of processing includes the steps of:
1.) reading a top path from the data structure;
2.) extending the top path with all possible successor stroke labels to form one or more extended paths;
3.) merging the extended paths into the search space as a function of score; and
4.) repeating from step (1.) until an end of input condition is reached.

30. A method for identifying a valid symbol from a sequence of handwritten strokes, for each handwritten stroke the method comprises the steps of:
comparing a handwritten stroke to a plurality of stroke templates to identify a symbol or symbols of which the handwritten stroke may be a constituent;
associating the handwritten stroke with a portion of each identified symbol to form a stroke label;
assigning a score to each stroke label, the score having a value that is a function of a degree of similarity between the handwritten stroke and the stroke template corresponding to the identified symbol;
ordering the stroke labels associated with the handwritten stroke by order of score; and
processing the stroke labels associated with the handwritten stroke by determining which stroke labels, if any, when combined with stroke labels associated with a subsequent handwritten stroke, comprise a valid symbol or a portion of a valid symbol, wherein the step of processing includes an initial step of storing the stroke labels within a data structure by order of score value, the data structure storing all or a portion of all paths through a search space defined by the stroke labels, and wherein the step of processing includes the steps of:

1.) removing a top path from the data structure;

1.5) extending a younger sister path from a parent of the top-path;

1.6) merging the younger sister path back into the data structure as a function of score;

1.7) sending the top path through at least one constraint validation filter;

if the top path survives the filter,

2.) extending the top path with the best one among candidates returned from the constraint validation filter;

3a.) merging the extending top path back into the data structure with an associated FLAG=OPEN;

3b.) merging the original top-path back into the data structure with an associated FLAG=CLOSED; and 4.) repeating the steps of the procedure from (1.) until an end of input condition is reached.

31. A method as set forth in claim 27 wherein the step of associating includes a step of generating a stroke label having the form (m/nC), where C is the identified symbol, where m is indicative of a number of a specific stroke out of a sequence of strokes that comprise C, and wherein n is indicative of a total number of strokes in the sequence of strokes.

32. Apparatus for identifying a valid symbol or a string of valid symbols from a sequence of handwritten strokes, comprising:

means for generating, in response to one or more handwritten strokes, a plurality of stroke labels each having an associated score;

means for storing the stroke labels within a first data structure; and means for processing selected ones of the plurality of stored stroke labels with one more constraint validation filter means to identify stored stroke labels that are indicative of a valid symbol or portion of a valid symbol, the processing means including means for storing within a second data structure any stroke labels identified as being indicative of a valid symbol or portion of a valid symbol.

* * * * *